United States Patent
Katsuya (10) Patent No.: US 12,472,834 B2
(45) Date of Patent: Nov. 18, 2025

(54) POWER CONTROL DEVICE FOR ENHANCED EFFICIENCY IN POWER CONVERSION

(71) Applicant: HONDA MOTOR CO., LTD., Tokyo (JP)

(72) Inventor: Jin Katsuya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 339 days.

(21) Appl. No.: 18/110,383

(22) Filed: Feb. 16, 2023

(65) Prior Publication Data

US 2023/0302925 A1 Sep. 28, 2023

(30) Foreign Application Priority Data

Mar. 22, 2022 (JP) ................................. 2022-045988

(51) Int. Cl.
*B60L 53/122* (2019.01)
*H02P 11/04* (2006.01)
*H02P 101/45* (2016.01)

(52) U.S. Cl.
CPC ............ *B60L 53/122* (2019.02); *H02P 11/04* (2013.01); *B60L 2210/30* (2013.01); *H02P 2101/45* (2015.01); *H02P 2201/03* (2013.01)

(58) Field of Classification Search
CPC .... B60L 53/122; B60L 2210/30; H02P 11/04; H02P 2101/03; H02P 2101/45

(Continued)

(56) References Cited

U.S. PATENT DOCUMENTS

2006/0208715 A1* 9/2006 Saeki .................. H02M 3/1588
    323/282
2009/0230939 A1* 9/2009 Nakazawa .......... H02M 3/1588
    323/285

(Continued)

FOREIGN PATENT DOCUMENTS

JP     2010-124678     6/2010
JP     2016-140158     8/2016

(Continued)

OTHER PUBLICATIONS

Japanese Office Action for Japanese Patent Application No. 2022-045988 mailed Feb. 6, 2024.

*Primary Examiner* — Yemane Mehari
(74) *Attorney, Agent, or Firm* — Amin, Turocy & Watson, LLP (57) ABSTRACT

A power control device includes a power receiving unit, a power converting unit, and a control device. The power receiving unit includes a secondary coil that receives AC electric power transmitted from a power transmitting device in a non-contact manner. The power converting unit includes transistors with two phases as a pair connected to the secondary coil. The power converting unit converts the AC electric power received by the power receiving unit to DC electric power. The control device performs a synchronous rectification operation of rectifying the AC electric power by synchronously driving the transistors in two phases when a target output is equal to or greater than a target output. The control device controls the synchronous rectification operation and a short-circuiting operation of short-circuiting the secondary coil using the transistors in two phases through pulse frequency modulation when the target output is less than the predetermined value.

2 Claims, 7 Drawing Sheets

(58) Field of Classification Search
USPC .......................................................... 323/205
See application file for complete search history.

(56) References Cited

U.S. PATENT DOCUMENTS

| | | |
|---|---|---|
| 2010/0172157 A1 | 7/2010 | Chen et al. |
| 2011/0215773 A1* | 9/2011 | Iwai ..................... H02P 9/48 |
| | | 322/28 |
| 2014/0028092 A1* | 1/2014 | Takeshima ........ H02M 3/33507 |
| | | 363/16 |
| 2015/0224883 A1* | 8/2015 | Ichikawa ................ B60L 50/51 |
| | | 320/108 |

FOREIGN PATENT DOCUMENTS

| | | |
|---|---|---|
| JP | 2017-011875 | 1/2017 |
| JP | 2017-093094 | 5/2017 |
| WO | 2012/144249 | 10/2012 |

* cited by examiner

POWER CONTROL DEVICE FOR ENHANCED EFFICIENCY IN POWER CONVERSION

CROSS-REFERENCE TO RELATED APPLICATION

Priority is claimed on Japanese Patent Application No. 2022-045988, filed Mar. 22, 2022, the content of which is incorporated herein by reference.

BACKGROUND OF THE INVENTION

Field of the Invention

The present invention relates to a power control device.

Description of Related Art

In the related art, interest in electric vehicles has increased for the sake of reducing adverse effects on the global environment, and systems for supplying electric power from the outside in a non-contact manner at the time of traveling of an electric vehicle or the like have been studied.
In the related art, a power receiving device for controlling power transmission efficiency and received electric power by changing a short-circuiting mode and a rectification mode in a receiving-side power converter that controls power conversion through pulse width modulation (PWM) is known (for example, see Japanese Unexamined Patent Application, First Publication No. 2017-93094)
In the related art, a non-contact power supply device for controlling switching elements of a transmitting-side inverter and a receiving-side bridge rectifier circuit that control power conversion through pulsed width modulation is known (for example, see Japanese Unexamined Patent Application, First Publication No. 2017-11875).

SUMMARY OF THE INVENTION

In the aforementioned devices, there is demand for a decrease in loss by performing soft switching at the time of power conversion. However, soft switching can be maintained in synchronous rectification in a high-output area including a maximum output, but soft switching cannot be maintained and hard switching may occur, which increases a loss in a low-output area.
Aspects of the present invention were invented in consideration of the aforementioned circumstances and an objective thereof is to provide a power control device that can decrease a loss.
The present invention employs the following aspects to achieve the aforementioned objective.
(1) A power control device according to an aspect of the present invention includes: a power receiving unit including a coil that receives AC electric power transmitted from a power transmitting device in a non-contact manner; a power converting unit including a plurality of switching elements connected to the coil and configured to convert the AC electric power received by the power receiving unit to DC electric power; and a control device configured to control a switching operation of the plurality of switching elements. The control device is configured to perform a synchronous rectification operation of rectifying the AC electric power by synchronously driving the plurality of switching elements when a target output is equal to or greater than a predetermined value and to control the synchronous rectification operation and a short-circuiting operation of short-circuiting the coil using the plurality of switching elements through pulse frequency modulation when the target output is less than the predetermined value.
(2) In the aspect of (1), the plurality of switching elements may be bridge-connected in a plurality of phases, and the control device may be configured to set the switching elements to an off state in the plurality of phases in a low-side arm while maintaining the synchronous rectification operation using the switching elements in the plurality of phases in a high-side arm in the short-circuiting operation.
According to the aspect of (1), even when an efficiency decrease due to a switching loss of the plurality of switching elements occurs in a low-output area of the power converting unit, it is possible to curb an increase in loss.
Even when a time required for discharging completion of output capacities of the switching elements increases with a decrease in a current in the power-output area of the power converting unit, it is possible to secure the discharging completion and to maintain soft switching which is zero voltage switching by increasing an off time with a decrease in frequency due to pulse frequency modulation.
According to the aspect of (2), by setting only the low-side arm to an off state while maintaining the synchronous rectification operation using the high-side arm, it is possible to maintain the synchronous rectification operation according to a magnitude and a phase of a current flowing in the coil of the power receiving unit. Since the voltage and the current of the coil become almost zero with short-circuiting of the coil of the power receiving unit using the low-side arm, it is possible to increase a receiving-side impedance when seen from the transmitting side and to narrow the current in the power transmitting device. It is possible to control the current in a primary power transmitting device using a secondary power converting unit and to perform independent power control on the secondary side.

DETAILED DESCRIPTION OF THE INVENTION

Hereinafter, a power control device according to an embodiment of the present invention will be described with reference to the accompanying drawings.

Figure 1:
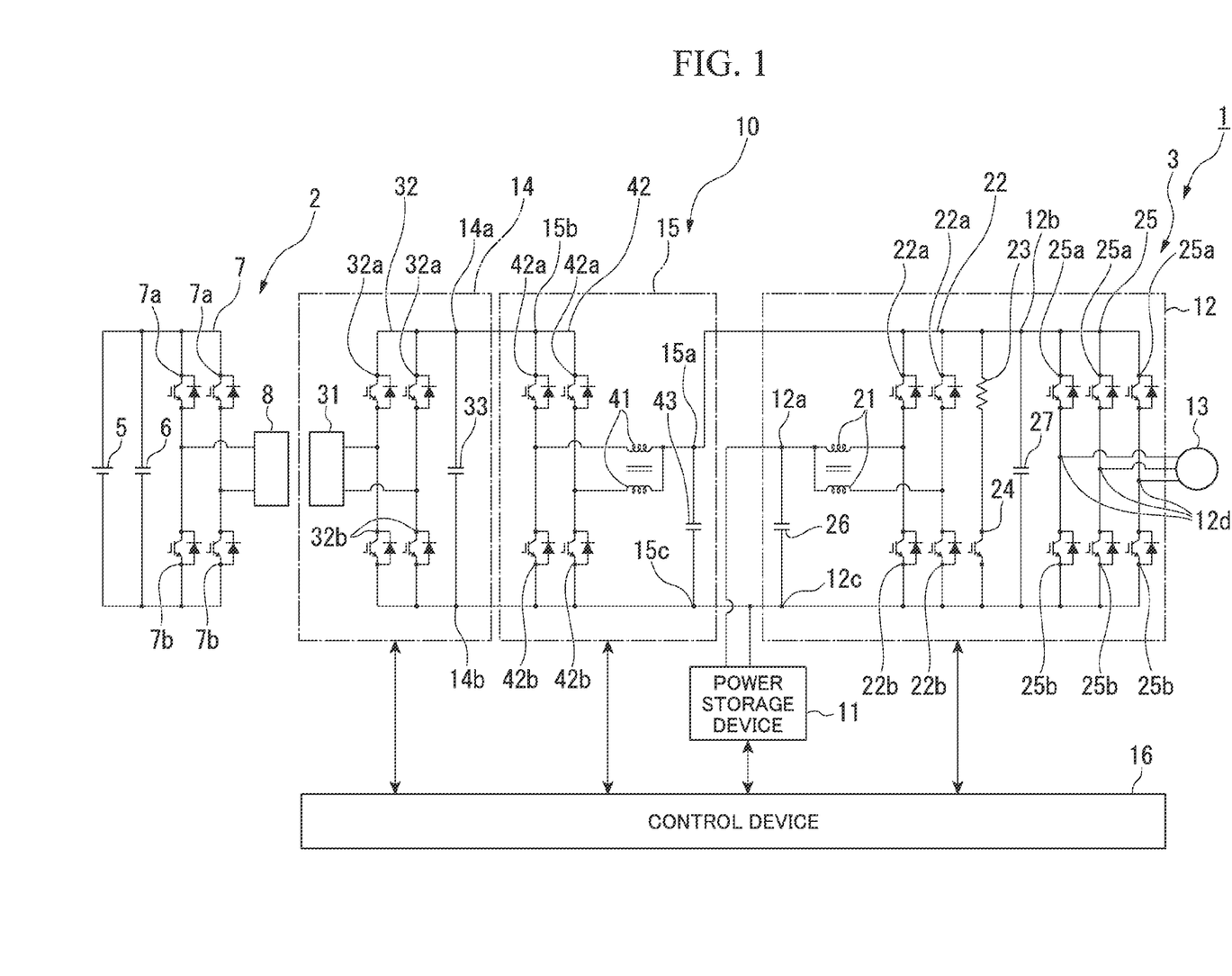
FIG. 1 is a diagram illustrating a configuration of a non-contact power transmission system including a power control device according to an embodiment of the present invention.
Figure 2:
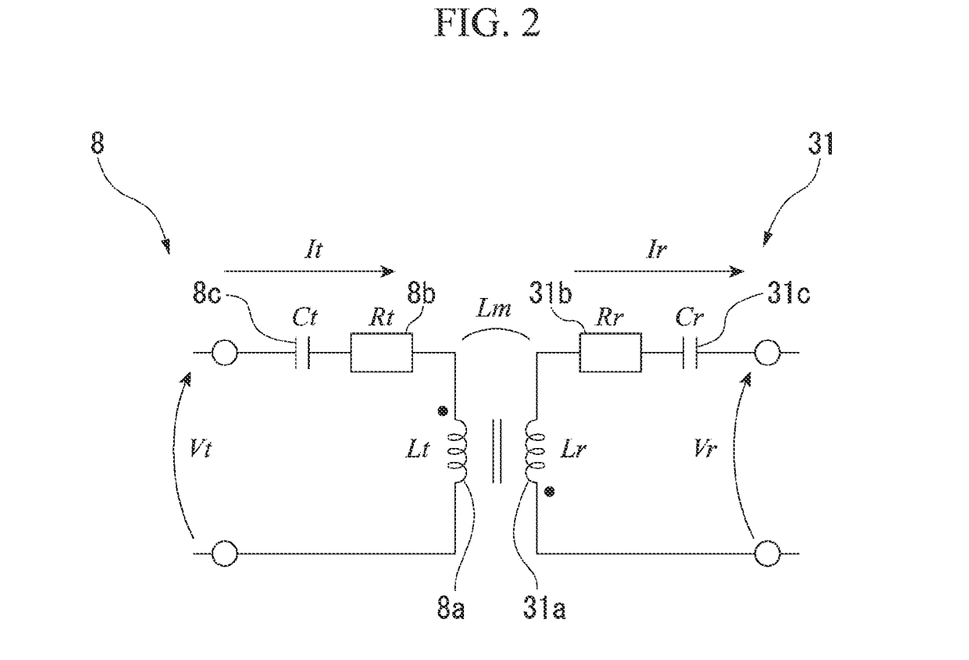
FIG. 2 is a diagram illustrating configurations of a power transmitting unit and a power receiving unit of the non-contact power transmission system according to the embodiment of the present invention.

FIG. 1 is a diagram illustrating a configuration of a non-contact power transmission system 1 including a power control device 10 according to an embodiment of the present invention. FIG. 2 is a diagram illustrating configurations of a power transmitting unit 8 and a power receiving unit 31 of the non-contact power transmission system 1 according to the embodiment of the present invention.

The power control device 10 according to the embodiment is mounted in a vehicle. The non-contact power transmission system 1 including the power control device 10 supplies electric power from the outside of the vehicle to the vehicle in a non-contact manner.

(Non-Contact Power Transmission System)

As illustrated in FIG. 1, the non-contact power transmission system 1 according to the embodiment includes, for example, a power transmitting device 2 that is installed on a traveling path of the vehicle or the like and a drive control device 3 and a power control device 10 that are mounted in the vehicle.

The power transmitting device 2 includes, for example, a power supply unit 5, a capacitor 6, a power converting unit 7, and a power transmitting unit 8.

The power supply unit 5 includes, for example, an AC power supply such as a commercial power supply and an AC-DC converter that converts AC electric power to DC electric power. The power supply unit 5 converts AC electric power supplied from the AC power supply to DC electric power using the AC-DC converter.

The capacitor 6 is connected in parallel to the power supply unit 5. The capacitor 6 smooths DC electric power output from the power supply unit 5.

The power converting unit 7 includes, for example, an inverter that converts DC electric power to AC electric power. The power converting unit 7 includes a bridge circuit including a plurality of switching elements that are bridge-connected in two phases and a rectification element. Each of the switching elements is, for example, a transistor such as a metal oxide semiconductor field-effect transistor (MOSFET) of silicon carbide (SiC). The plurality of switching elements include transistors 7a and 7b in a high-side arm and a low-side arm forming a pair in each phase. A collector of the transistor 7a in the high-side arm is connected to a positive electrode of the power supply unit 5. An emitter of the transistor 7b in the low-side arm is connected to a negative electrode of the power supply unit 5. An emitter of the transistor 7a in the high-side arm and a collector of the transistor 7b in the low-side arm are connected to the power transmitting unit 8. Each rectification element is a backflow diode that is forward connected in parallel from the emitter to the collector between the collector and the emitter of each of the transistors 7a and 7b.

The power transmitting unit 8 transmits electric power through change in a high-frequency magnetic field, for example, by magnetic-field coupling such as magnetic resonance or electromagnetic induction. As illustrated in FIG. 2, the power transmitting unit 8 includes, for example, a resonance circuit which is formed by a primary coil 8a, a primary resistor 8b, and a primary capacitor 8c which are connected in series.

As illustrated in FIG. 1, the drive control device 3 of the vehicle includes, for example, a power storage device 11, a first power converting device 12, and a rotary electric machine 13.

The power control device 10 of the vehicle includes, for example, a power receiving device 14, a second power converting device 15, and a control device 16.

The power storage device 11 is charged with electric power that is transmitted from the power transmitting device 2 outside of the vehicle 1 in a non-contact manner. The power storage device 11 receives and transmits electric power from and to the rotary electric machine 13 via the first power converting device 12.

The power storage device 11 includes, for example, a battery such as a lithium ion battery and a voltage controller for performing bidirectional voltage conversion for step-up and step-down. The power storage device 11 converts input electric power and output electric power using a voltage controller at the time of charging and discharging of the battery. The power storage device 11 is connected to a positive terminal 12a on the primary side and a negative terminal 12c of the first power converting device 12 which will be described later.

The first power converting device 12 includes, for example, a voltage converter for performing bidirectional voltage conversion for step-up and step-down and a power converter for performing conversion between DC electric power and AC electric power. The first power converting device 12 includes, for example, a pair of reactors 21, a first element module 22, a resistor 23, a switching element 24, a second element module 25, a first capacitor 26, and a second capacitor 27.

The pair of reactors 21 are magnetically coupled in opposite polarities to form a compound reactor. The pair of reactors 21 are connected to the positive terminal 12a and the first element module 22 on the primary side.

The first element module 22 includes, for example, a bridge circuit including a plurality of switching elements that are bridge-connected in two phases and a rectification element. Each of the switching elements is, for example, a transistor such as a MOSFET of silicon carbide (SiC). The plurality of switching elements include transistors 22a and 22b in a high-side arm and a low-side arm forming a pair in each phase. A collector of the transistor 22a in the high-side arm is connected to the positive terminal 12b on the secondary side. An emitter of the transistor 22b in the low-side arm is connected to the negative terminal 12c which is common to the primary side and the secondary side. The emitter of the transistor 22a in the high-side arm and the collector of the transistor 22b in the low-side arm are connected to the reactor 21. Each rectification element is a backflow diode that is forward connected in parallel from the emitter to the collector between the collector and the emitter of each of the transistors 22a and 22b.

The pair of reactors 21 and the first element module 22 perform voltage conversion through so-called two-phase interleave. In the two-phase interleave, a first period of switching control of the transistors 22a and 22b in a first phase and a first period of switching control of the transistors 22a and 22b in a second phase out of the transistors 22a and 22b in two phases connected to the pair of reactors 21 are deviated from each other by a half period.

The resistor 23 and the switching element 24 are connected in series. The switching element 24 is, for example, a transistor such as a MOSFET of SiC. The resistor 23 is connected to the positive terminal 12b and the collector of the switching element 24 on the secondary side and the emitter of the switching element 24 is connected to the negative terminal 12c.

The second element module 25 includes, for example, a bridge circuit including a plurality of switching elements that are bridge-connected in three phases and a rectification element. Each of the switching elements is, for example, a transistor such as a MOSFET of silicon carbide (SiC). The plurality of switching elements include transistors 25a and 25b in a high-side arm and a low-side arm forming a pair in each phase. A collector of the transistor 25a in the high-side arm is connected to the positive terminal 12b on the secondary side. An emitter of the transistor 25b in the low-side arm is connected to the negative terminal 12c. The emitter of the transistor 25a in the high-side arm and the collector of the transistor 25b in the low-side arm are connected to the stator winding of the rotary electric machine 13 via an AC terminal 12d. Each rectification element is, for example, a backflow diode that is forward connected in parallel from the emitter to the collector between the collector and the emitter of each of the transistors 25a and 25b.

The first capacitor 26 is connected to the positive terminal 12a and the negative terminal 12c on the primary side. The second capacitor 27 is connected to the positive terminal 12b and the negative terminal 12c on the secondary side between the first element module 22 and the second element module 25. The capacitors 26 and 27 smooth voltage change that occurs with an operation of switching the switching elements between an on state (connected) and an off state (disconnected) of each switching element.

The second element module 25 controls an operation of the rotary electric machine 13 through transmission and reception of electric power. The second element module 25 converts DC electric power input from the positive terminal and the negative terminal to three-phase AC electric power and supplies the three-phase AC electric power to the rotary electric machine 13, for example, when the rotary electric machine 13 is powered. The second element module 25 generates a rotational driving force by causing a current to flow sequentially to three-phase stator windings of the rotary electric machine 13.

The second element module 25 converts three-phase AC electric power input from the three-phase stator windings to DC electric power by driving the on state (connected) and the off state (disconnected) of the switching elements in the phases which are synchronized with rotation of the rotary electric machine 13, for example, when the rotary electric machine 13 is regenerated. The second element module 25 can supply DC electric power to which three-phase AC electric power is converted to the power storage device 11 via the pair of reactors 21 and the first element module 22.

The rotary electric machine 13 is, for example, a brushless DC motor of three-phase AC. The rotary electric machine 13 includes a rotor that includes a permanent magnet for a magnetic field and a stator that includes three-phase stator windings for generating a rotary magnetic field for generating the rotor. The three-phase stator windings are connected to AC terminals 12d of three phases of the first power converting device 12.

The rotary electric machine 13 generates a rotational driving force by performing a powering operation using electric power supplied from the first power converting device 12. The rotary electric machine 13 generates a travel driving force by performing a powering operation using electric power supplied from the first power converting device 12, for example, when it can be connected to wheels of the vehicle. The rotary electric machine 13 may generate electric power by performing a regenerative operation using a rotational moving force input from the wheels of the vehicle. The rotary electric machine 13 may generate electric power using power of an internal combustion engine when it can be connected to the internal combustion engine of the vehicle.

The power receiving device 14 includes, for example, a power receiving unit 31, a power converting unit 32, and a capacitor 33.

As illustrated in FIG. 2, the power receiving unit 31 receives electric power based on change of a high-frequency magnetic field transmitted from the power transmitting unit 8 through magnetic-field coupling such as magnetic resonance or electromagnetic induction. The power receiving unit 31 includes, for example, a resonance circuit including a secondary coil 31a, a secondary resistor 31b, and a secondary capacitor 31c which are connected in series.

As illustrated in FIG. 1, the power converting unit 32 includes a so-called full-bridge (or bridgeless and totem-pole) power factor correction (PFC) circuit that converts AC electric power to DC electric power. The so-called bridgeless PFC circuit is an PFC not including a bridge rectifier using a plurality of diodes which are bridge-connected, and the so-called totem-pole PFC circuit is a PFC circuit including a pair of switching elements of the same conductivity type which are connected in series (totem-pole connected) in series in the same direction.

The power converting unit 32 includes, for example, a bridge circuit including a plurality of switching elements and the rectification elements which are bridge-connected in two phases. Each of the switching elements is, for example, a transistor such as an MOSFET of silicon carbide (SiC). The plurality of switching elements include transistors 32a and 32b in a high-side arm and a low-side arm forming a pair in each phase. A collector of the transistor 32a in the high-side arm is connected to the positive terminal 14a on the secondary side. An emitter of the transistor 32b in the low-side arm is connected to the negative terminal 14b on the secondary side. The emitter of the transistor 32a in the high-side arm and the collector of the transistor 32b in the low-side arm are connected to the power receiving unit 31. Each rectification element is, for example, a backflow diode that is forward connected in parallel from the emitter to the collector between the collector and the emitter of each of the transistors 32a and 32b.

The capacitor 33 is connected to the positive terminal 14a and the negative terminal 14b on the secondary side. The capacitor 33 smooths voltage change that occurs with an operation of switching the switching elements between an on state (connected) and an off state (disconnected) of each switching element.

The second power converting device 15 outputs arbitrary DC electric power by converting DC electric power output from the power receiving device 14. The second power converting device 15 includes, for example, a voltage converter for performing voltage conversion for step-down. The second power converting device 15 includes, for example, a pair of reactors 41, an element module 42, and a capacitor 43.

The pair of reactors 41 are magnetically coupled in opposite polarities to form a compound reactor. The pair of reactors 41 are connected to the positive terminal 15a and the element module 42 on the secondary side.

The element module 42 includes, for example, a bridge circuit including a plurality of switching elements and a rectification element that are bridge-connected in two phases. Each of the switching elements is, for example, a transistor such as an MOSFET of SiC. The plurality of switching elements include transistors 42a and 42b in a high-side arm and a low-side arm forming a pair in each phase. A collector of the transistor 42a in the high-side arm is connected to the positive terminal 15b on the primary side. An emitter of the transistor 42b in the low-side arm is connected to the negative terminal 15c which is common to the primary side and the secondary side. The emitter of the transistor 42a in the high-side arm and the collector of the transistor 42b in the low-side arm are connected to the reactor 41. Each rectification element is a backflow diode that is forward connected in parallel from the emitter to the collector between the collector and the emitter of each of the transistors 42a and 42b.

The pair of reactors 41 and the first element module 42 perform voltage conversion through so-called two-phase interleave. In the two-phase interleave, a first period of switching control of the transistors 42a and 42b in a first phase and a first period of switching control of the transistors 42a and 42b in a second phase out of the transistors 42a and 42b in two phases connected to the pair of reactors 41 are deviated from each other by a half period.

The capacitor 43 is connected to the positive terminal 15a and the negative terminal 15c on the secondary side. The capacitor 43 smooths voltage change that occurs with an operation of switching the switching elements between an on state (connected) and an off state (disconnected) of each switching element.

The positive terminal 15b on the primary side of the second power converting device 15 is connected to the positive terminal 14a on the secondary side of the power receiving device 14.

The positive terminal 15a on the secondary side of the second power converting device 15 is connected to the positive terminal 12b on the secondary side of the first power converting device 12.

The negative terminal 15c of the second power converting device 15 is connected to the negative terminal 14b on the secondary side of the power receiving device 14 and the negative terminal 12c of the first power converting device 12.

The control device 16 comprehensively controls, for example, the drive control device 3 of the vehicle and the power control device 10. The control device 16 is, for example, a software functional unit serving by causing a processor such as a central processing unit (CPU) to execute a predetermined program. The software functional unit is an electronic central unit (ECU) including the processor such as the CPU and electronic circuits such as a read only memory (ROM) storing a program, a random access memory (RAM) temporarily storing data, and a timer. At least a part of the control device 16 may be integrated circuit such as a large scale integration (LSI) circuit.

For example, the control device 16 generates a control signal indicating timings for driving the switching elements in the on (connected) state and the off (disconnected) state of each switching element and generates a gate signal for actually driving the switching elements between the on (connected) state and the off (disconnected) state on the basis of the control signal. For example, the control device 16 performs power factor correction of an input voltage and an input current while rectifying AC electric power received from the power transmitting device 2 to DC electric power by controlling switching of the switching elements of the power receiving device 14.

Figure 3:
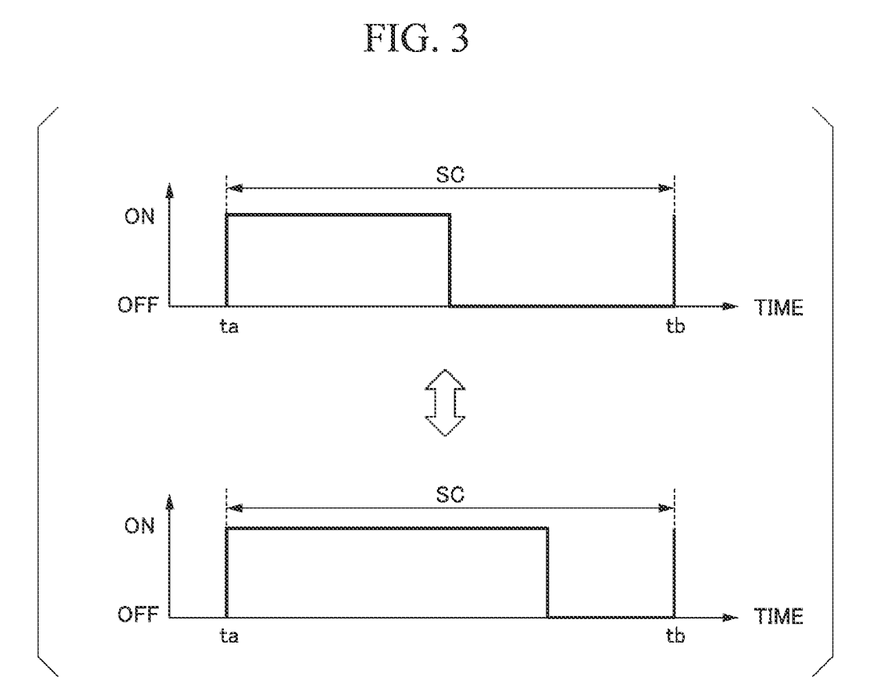
FIG. 3 is a diagram illustrating an example in which pulse width modulation control in a synchronous rectification operation of a power receiving device according to the embodiment of the present invention is turned on and off.
Figure 4:
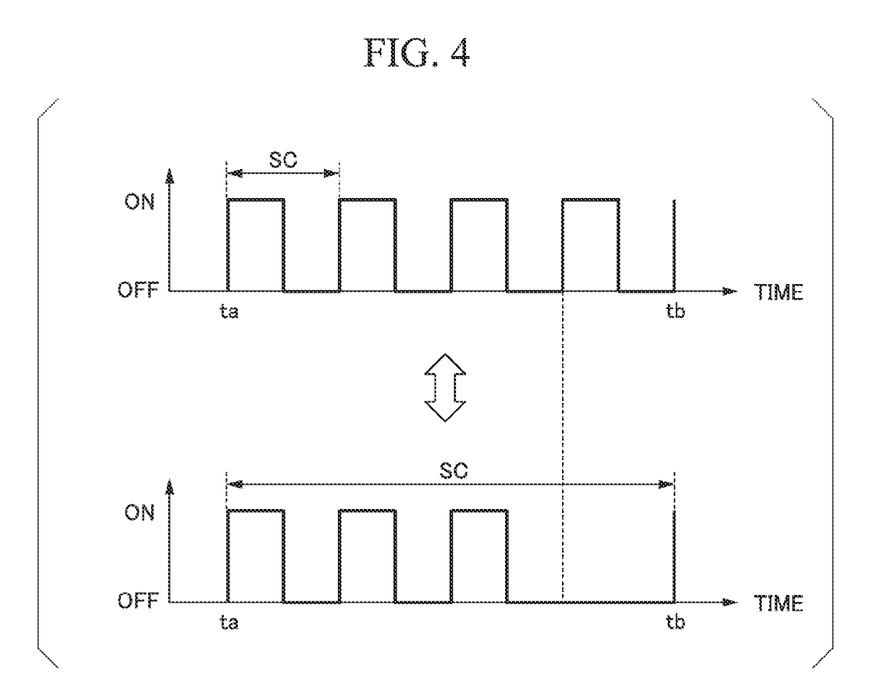
FIG. 4 is a diagram illustrating an example in which pulse frequency modulation control in a short-circuiting operation of the power receiving device according to the embodiment of the present invention is turned on and off.

FIG. 3 is a diagram illustrating an example in which pulse width modulation control in a synchronous rectification operation of the power receiving device 14 according to the embodiment is turned on and off. FIG. 4 is a diagram illustrating an example in which pulse frequency modulation control in a short-circuiting operation of the power receiving device 14 according to the embodiment is turned on and off.

For example, when a target output of the power receiving device 14 is equal to or greater than a predetermined value, the control device 16 controls the synchronous rectification operation of synchronously driving the plurality of switching elements of the power receiving device 14 between the on (connected) state and the off (disconnected) state using pulse width modulation (PWM) as illustrated in FIG. 3. The control device 16 controls an output based on the target output by changing an on time in a predetermined switching period SC in the pulse width modulation (PWM).

For example, when the target output of the power receiving device 14 is less than the predetermined value, the control device 16 controls the synchronous rectification operation and the short-circuiting operation of short-circuiting the secondary coil 31a through pulse frequency modulation (PFM) as illustrated in FIG. 4. The pulse frequency modulation (PFM) is, for example, of a fixed on-time type. The control device 16 controls the output based on the target output by changing the frequency such that the on time in which the synchronous rectification operation is set to be fixed and the off time in which the short-circuiting operation is performed is changed.

Figure 5:
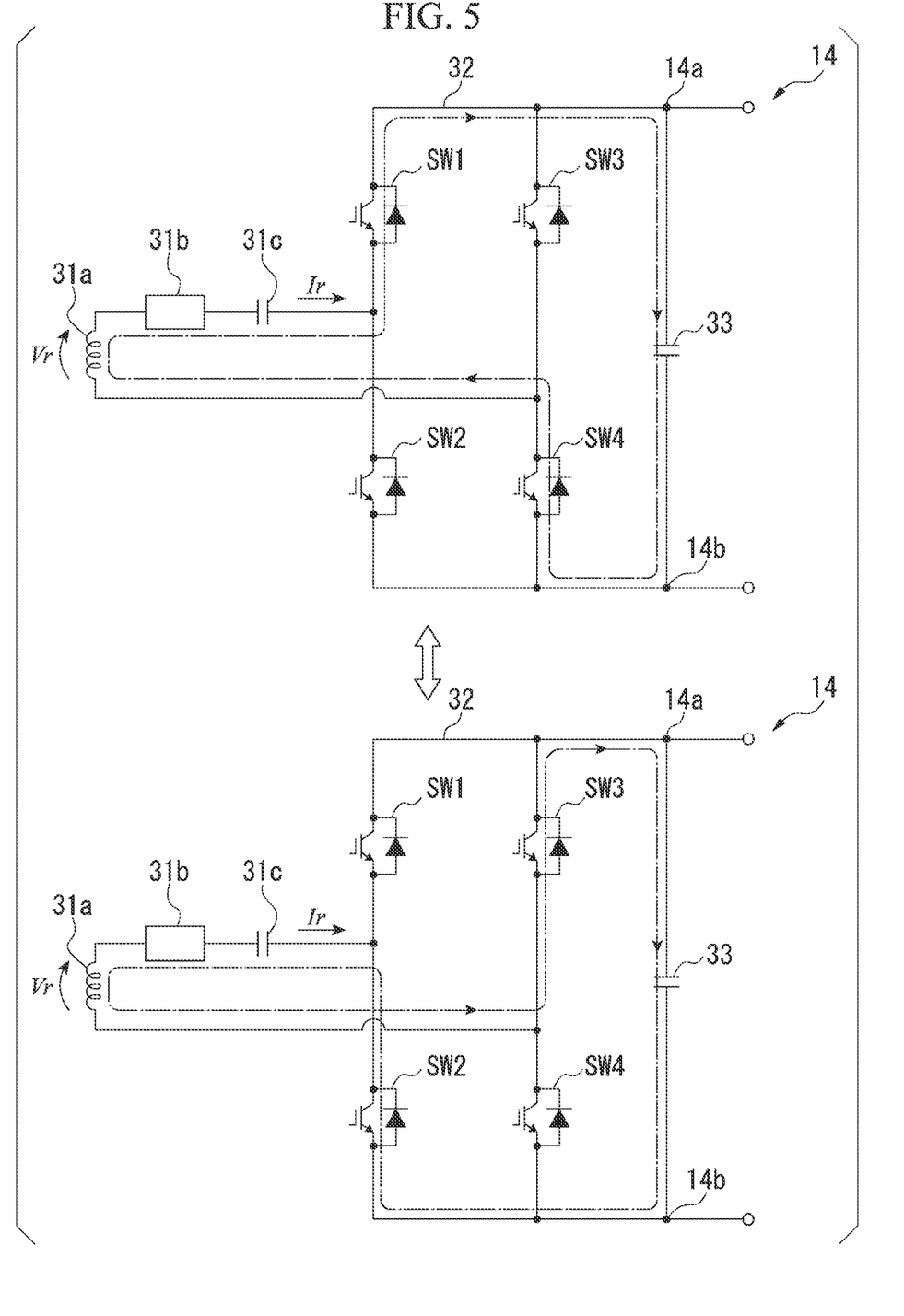
FIG. 5 is a diagram illustrating a state example of the synchronous rectification operation of the power receiving device according to the embodiment of the present invention.
Figure 6:
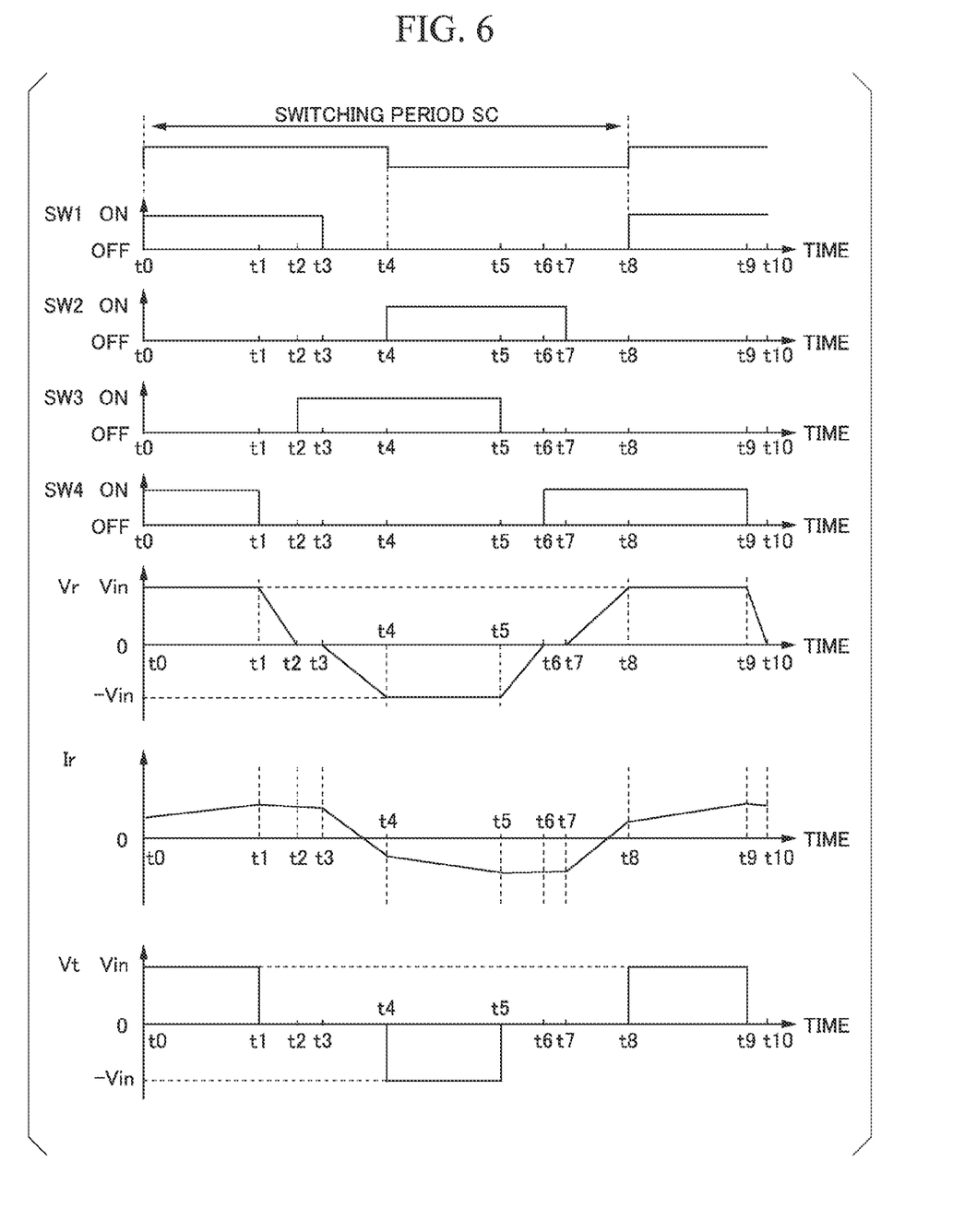
FIG. 6 is a diagram illustrating on and off states of switching elements in the synchronous rectification operation of the power receiving device, a voltage across both terminals of a secondary coil, a current flowing in the secondary coil, and a voltage across both terminals of a primary coil.

FIG. 5 is a diagram illustrating a state example of the synchronous rectification operation of the power receiving device 14 according to the embodiment. FIG. 6 is a diagram illustrating the on and off states of the switching elements in the synchronous rectification operation of the power receiving device 14, a voltage across both terminals Vr of the secondary coil 31a, a current Ir flowing in the secondary coil 31a, and a voltage across both terminals Vt of the primary coil 8a.

The control device 16 detects a current generated in the power receiving unit 31, that is, a current Ir flowing in the secondary coil 31a, using electric power transmitted from the power transmitting unit 8 and controls the synchronous rectification operation on the basis of the magnitude and the phase of the current Ir.

As illustrated in FIGS. 5 and 6, the control device 16 controls turning-on and turning-off of the switching elements through so-called pulse width modulation (PWM) of a phase shift type in the synchronous rectification operation. In the following description, the transistors 32a and 32b in the high-side arm and the low-side arm forming a pair in a first phase are referred to as a first switching element SW1 and a second switching element SW2, and the transistors 32a and 32b of the high-side arm and the low-side arm forming a pair in a second phase are referred to as a third switching element SW3 and a fourth switching element SW4.

The control device 16 controls the switching elements SW1, SW2, SW3, and SW4 in a high-output area including a maximum output of the power receiving device 14 through soft switching such as so-called zero voltage switching (ZVS). The control device 16 performs soft switching by setting a dead-time correction value according to a vehicle height condition based on a distance between the primary coil 8a and the secondary coil 31a and electrical characteristics of the vehicle in order to reduce a switching loss due to high-frequency switching. In the zero voltage switching (ZVS), the switching elements SW1, SW2, SW3, and SW4 are turned on (changes from the off state to the on state) after changing the voltage across both terminals to zero by discharging of the output capacity (parasitic capacity) in the off state in the dead-time period of each phase.

For example, a period from time t1 to time t2 in FIG. 6 is a period of zero voltage switching of the third switching element SW3, a period from time t3 to time t4 is a period of zero voltage switching of the second switching element SW2, a period from time t5 to time t6 is a period of zero voltage switching of the fourth switching element SW4, and a period from time t7 to time t8 is a period of zero voltage switching of the first switching element SW1. In the periods of zero voltage switching, since backflow diodes of the switching elements SW1, SW2, SW3, and SW4 are conducted, for example, the drain-source voltage in the MOSFET is almost zero.

Figure 7:
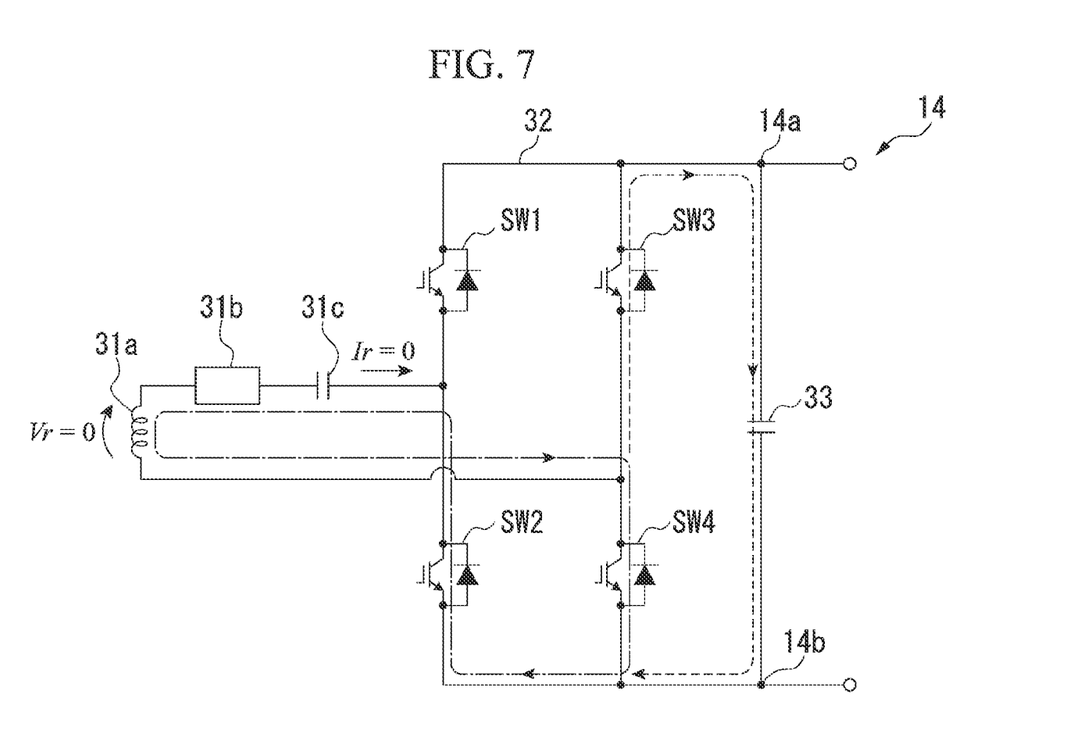
FIG. 7 is a diagram illustrating a state example of a short-circuiting operation of the power receiving device according to the embodiment of the present invention.

FIG. 7 is a diagram illustrating a state example of the short-circuiting operation of the power receiving device 14 according to the embodiment.

As illustrated in FIG. 7, the control device 16 short-circuits the secondary coil 31a by switching only the low-side arm in each phase to the off state while continuing to perform the synchronous rectification operation in the zero voltage switching (ZVS) in the high-side arm in each phase in the short-circuiting operation. When the second switching element SW2 and the fourth switching element SW4 which are the transistors 32b in the low-side arm in each phase are turned off, a current gathering in the secondary capacitor 31c connected in series to the secondary coil 31a flows to the smoothing capacitor 33 via the backflow diode in the high-side arm. Accordingly, since the voltage across both terminals Vr of the secondary coil 31a decreases to zero and the secondary coil 31a does not serve as a coil because there is no potential difference, the current Ir based on generation of a magnetic field in the power transmitting unit 8 becomes very small. At this time, when the power receiving device 14 on the secondary side is seen from the power transmitting device 2 on the primary side, the impedance on the secondary side has a very large value, the impedance on the primary side also increases, and thus a current on the primary side (a power-transmitting current: the current It flowing in the primary coil 8a) is narrowed. That is, the current in the power transmitting device 2 on the primary side is controlled by the power receiving device 14 on the secondary side. The first switching element SW1 and the third switching element SW3 which are the transistor 32a in the high-side arm in each phase in which the synchronous rectification operation is performed according to the current Ir flowing in the secondary coil 31a stop switching of the synchronous rectification operation because threshold currents are not exceeded, and are separated from the capacitor 31c on the secondary side.

As illustrated in FIG. 2, the primary coil 8a of the power transmitting unit 8 and the secondary coil 31a of the power receiving unit 31 are set to opposite polarities to each other. The control device 16 controls switching of the switching elements of the power receiving device 14 through so-called phase difference switching in which one period of switching control in the power converting unit 32 of the power receiving device 14 is deviated from one period of switching control in the power converting unit 7 of the power transmitting device 2.

Figure 8:
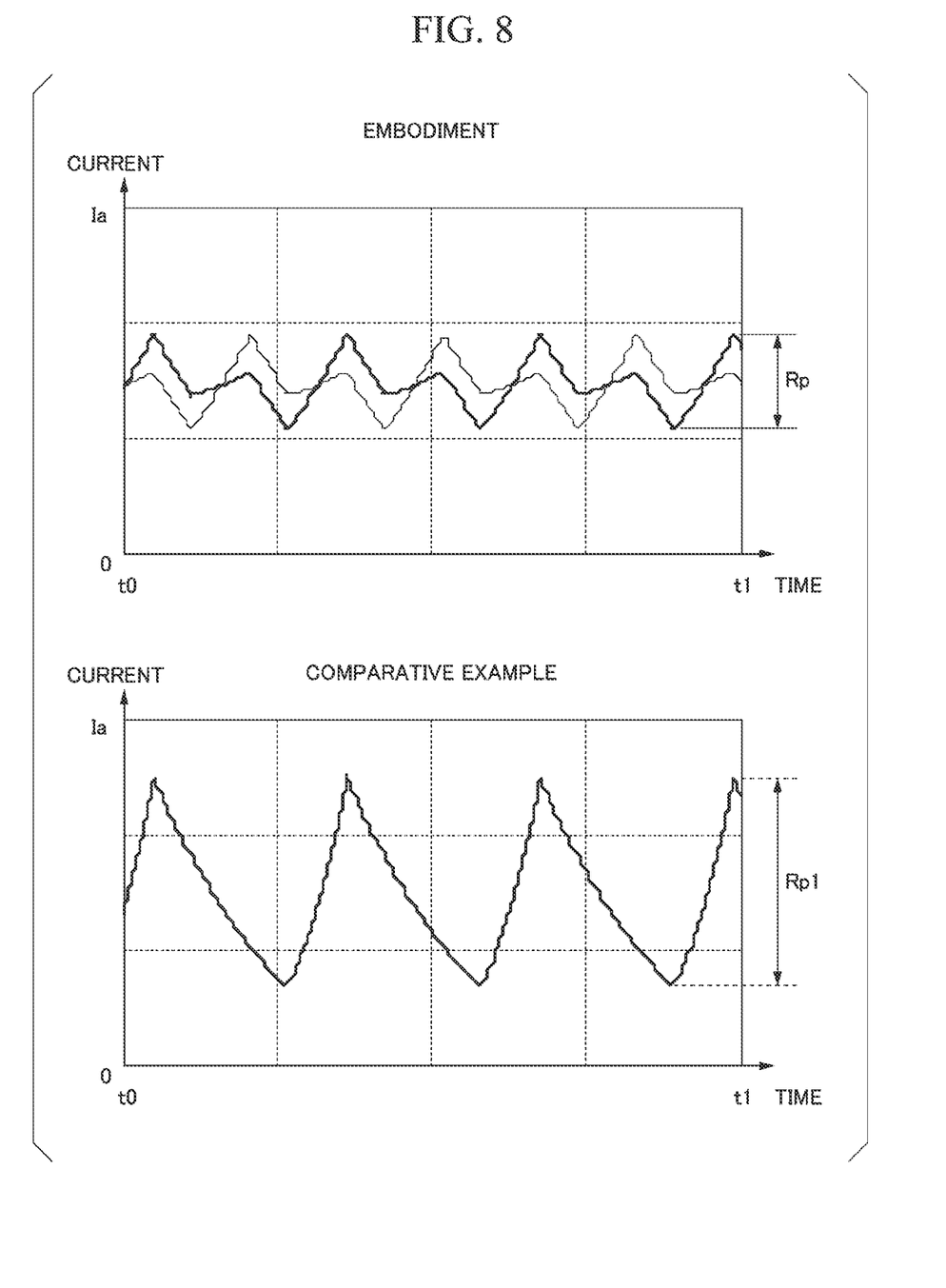
FIG. 8 is a diagram illustrating changes of currents in phases in the power control device according to the embodiment of the present invention and a power control device according to a comparative example.

FIG. 8 is a diagram illustrating changes of the currents in phases in the power control device 10 according to the embodiment of the present invention and a power control device according to a comparative example. In FIG. 8, the configuration of the power control device 10 according to the embodiment and the configuration of the power control device according to the comparative example are the same, the power receiving device 14 according to the embodiment is controlled through phase difference switching, and the power receiving device 14 according to the comparative example is controlled through in-phase switching. In the in-phase switching, mutual switching control between the power converting unit 7 of the power transmitting device 2 and the power converting unit 32 of the power receiving device 14 is performed in the same phase.

In the power control device 10 according to the embodiment, DC components of magnetic fluxes interlinking each other between the primary coil 8a of the power transmitting unit 8 and the secondary coil 31a of the power receiving unit 31 are cancelled, but AC components thereof are left by the phase difference switching in the power receiving device 14. On the other hand, in the power control device according to the comparative example, all the magnetic fluxes interlinking each other between the primary coil 8a of the power transmitting unit 8 and the secondary coil 31a of the power receiving unit 31 are cancelled by the in-phase switching of the power receiving device 14. Inductances in the primary coil 8a and the secondary coil 31a and leakage inductances are left in the embodiment, but only the leakage inductances are left in the comparative example and thus the inductances decrease relatively.

As illustrated in FIG. 8, it can be seen that, due to the difference in inductance magnitude, a current ripple Rp in the embodiment is less than a current ripple Rp1 in the comparative example and a loss in the embodiment is less than a loss in the comparative example.

As described above, with the power control device 10 according to the embodiment, it is possible to curb an increase in loss by change from the pulse width modulation (PWM) control in which a decreases in efficiency is caused due to switching losses of the plurality of switching elements SW1, SW2, SW3, and SW4 in the low-output area of the power receiving device 14 to the pulse frequency modulation (PFM) control.

Even when a time required for discharging completion of output capacities of the switching elements SW1, SW2, SW3, and SW4 increases with a decrease in a current in the low-output area of the power receiving device 14, it is possible to secure the discharging completion and to maintain soft switching which is zero voltage switching by increasing the off time with a decrease in frequency due to the pulse frequency modulation (PFM).

In the short-circuiting operation of the power receiving device 14, by setting only the low-side arm to the off state while maintaining the synchronous rectification operation using the high-side arm, it is possible to maintain the synchronous rectification operation according to the magnitude and the phase of the current Ir flowing in the secondary coil 31a. Since the voltage Vr and the current Ir of the secondary coil 31a become almost zero with short-circuiting of the secondary coil 31a using the low-side arm, it is possible to increase the receiving-side impedance when seen from the transmitting side and to narrow the current in the power transmitting device 2. It is possible to control the current in the power transmitting device 2 on the primary side (a power-transmitting current: the current It flowing in the primary coil 8*a*) using the power receiving device 14 on the secondary side and to perform independent power control on the secondary side.

While an embodiment has been described above, these embodiments are provided as examples and are not intended to limit the scope of the present invention. These embodiments can be realized in various other forms, and various omissions, substitutions, and modifications can be added thereto without departing from the gist of the present invention. These embodiments and modifications thereof are included in the scope or gist of the present invention and are also included in the inventions described in the appended claims and equivalent scopes thereof.

What is claimed is:

1. A power control device comprising:
    a power receiving unit including a coil that receives AC electric power transmitted from a power transmitting device in a non-contact manner;
    a power converting unit including a plurality of switching elements connected to the coil and configured to convert the AC electric power received by the power receiving unit to DC electric power; and
    a control device configured to control a switching operation of the plurality of switching elements,
    wherein the control device is configured to:
        perform a synchronous rectification operation of rectifying the AC electric power by synchronously driving the plurality of switching elements when a target output is equal to or greater than a predetermined value; and
        control a cycle configured by two or more continuous synchronous rectification operations and a short-circuiting operation of short-circuiting the coil using the plurality of switching elements through pulse frequency modulation when the target output is less than the predetermined value.

2. The power control device according to claim 1, wherein the plurality of switching elements are bridge-connected in a plurality of phases, and
    wherein the control device is configured to set the switching elements to an off state in the plurality of phases in a low-side arm while maintaining the synchronous rectification operation using the switching elements in the plurality of phases in a high-side arm in the short-circuiting operation.

* * * * *